Nov. 30, 1965  D. W. BATTEAU ETAL  3,221,248
ELECTRICAL APPARATUS RESPONSIVE TO PARTICLE MOTION
THROUGH GUARD AND DETECTING ELECTRIC ENERGY FIELDS
Filed Sept. 28, 1959  3 Sheets-Sheet 1

*INVENTORS*
DWIGHT W. BATTEAU
SIDNEY LEES
BY
ATTORNEYS

Nov. 30, 1965        D. W. BATTEAU ETAL        3,221,248
      ELECTRICAL APPARATUS RESPONSIVE TO PARTICLE MOTION
        THROUGH GUARD AND DETECTING ELECTRIC ENERGY FIELDS
Filed Sept. 28, 1959                    3 Sheets-Sheet 2

INVENTORS
DWIGHT W. BATTEAU
SIDNEY LEES
BY

ATTORNEYS

Nov. 30, 1965 D. W. BATTEAU ETAL 3,221,248
ELECTRICAL APPARATUS RESPONSIVE TO PARTICLE MOTION
THROUGH GUARD AND DETECTING ELECTRIC ENERGY FIELDS
Filed Sept. 28, 1959 3 Sheets-Sheet 3

INVENTORS
DWIGHT W. BATTEAU
SIDNEY LEES
BY
ATTORNEYS 3,221,248
ELECTRICAL APPARATUS RESPONSIVE TO PARTICLE MOTION THROUGH GUARD AND DETECTING ELECTRIC ENERGY FIELDS
Dwight W. Batteau, 51 Lexington Ave., Cambridge, Mass., and Sidney Lees, 544 Walnut St., Newton, Mass.
Filed Sept. 28, 1959, Ser. No. 842,715
4 Claims. (Cl. 324—71)

The present invention relates in general to electrical apparatus responsive to the presence of particles in a fluid medium and more particularly concerns particle detection apparatus, wherein a particle crossing a boundary between adjacent energy fields causes the development of a transient signal which is sensed. Very little externally supplied power is required to establish the energy fields because kinetic energy of the particle moving through the field is converted into signal power. In addition, novel apparatus may be utilized to detect different types of particles by discriminating between the polarities of the transient signals developed in response to particles crossing the boundary between adjacent fields.

Particle detection by sensing changes in conductivity is well known in the art, a typical system being disclosed in Patent No. 2,656,508, for example. In a representative system, a fluid medium bearing the particles flows between two closely spaced electrodes having a relatively narrow common region therebetween. An electrical current is passed between the electrodes through the fluid. If the conductivity of the particles is different from that of the fluid, the electrical current fluctuates each time a particle enters the region in the gap between electrodes. By counting each current fluctuation, the number of particles passing between the electrodes may be determined.

While this technique may work satisfactorily for the disclosed medical laboratory purposes where the fluid medium is directly accessible and an electric current may be passed therethrough with safety, it is unsatisfactory for many other particle counting applications. For example, if it were desired to count the number of particles in the fuel system of an aircraft or other device powered by combustible fuel, it would be unsafe to pass a current through the fuel because of the danger of fire.

This problem was overcome by sensing the change in an energy field establishment by an inductor or capacitor as particles having a dielectric constant or magnetic permeability different from that of the fluid passed through the field in the manner disclosed in the copending application of Sidney Lees, Dwight W. Batteau and R. Steven Kleinschmidt entitled Particle Detector, Serial No. 731,222, filed April 28, 1958. In accordance with that invention, means are provided for establishing a static electric or magnetic field and the energy of the moving particles utilized to develop signal transients which are sensed to provide an indication of the number of particles.

The present invention contemplates and has as an important object the provision of improved means for detecting the presence of particles in a fluid medium with improved accuracy, without passing a direct current through the fluid medium.

It is another object of the invention to determine the precise instant a moving particle passes a predetermined boundary.

It is still another object of the invention to maximize the signal derived in response to a particle passing such predetermined boundary.

It is a further object of the invention to discriminate between the different types of particles.

Still a further object of the invention is to minimize spurious responses due to phenomena other than a particle crossing the predetermined boundary.

It is another object of the invention to achieve the foregoing objects with reliably operating apparatus relatively free from complexity while requiring very little operating power.

According to the invention, a particle bearing fluid medium is directed in sequence through adjacent guard and detecting energy fields and a transient component in the detecting field sensed as the particle crosses the boundary between the guard field and the detecting field. The guard field strength remains substantially constant. The energy field alteration property, such as the dielectric constant or magnetic permeability, of the particles is different from that of the fluid medium.

According to another feature of the invention, the particle bearing fluid medium passes through a terminating field adjacent to and following the detecting field so that a transient signal is developed only when the particle enters the detecting field.

In a specific form of the invention, a first conducting plate is placed opposite second and third substantially coplanar conducting plates having adjacent edges defining a narrow gap therebetween. A fixed potential is applied between the first and second plates to develop the guard field therebetween. This same potential is applied between the first and third plates through an impedance. When the particle bearing fluid medium is passed through the opposed plates, each particle crossing the plane including the gap between the second and third conducting plates causes a transient signal to be developed across the impedance. This signal is coupled to an output terminal to provide an output signal thereon. According to another feature of the invention, means are provided for selectively discriminating between transient signals of different polarity so that different types of particles may be detected.

Still another feature of the invention resides in tapering the trailing edges of the first conducting plate and the third conducting plate so that a terminating field of controlled form is developed between these tapered edges. As a result, a particle leaving the region between the tapered edges develops a low amplitude transient signal across the impedance with a long rise time. By coupling the signals developed across the impedance to the output terminal through a high pass filter, any signals which are produced in response to a particle leaving the region between the opposed plates are almost completely rejected.

Other features, objects and advantages of the invention will become apparent from the following specification when read in connection with the accompanying drawing in which.

Figure 7:
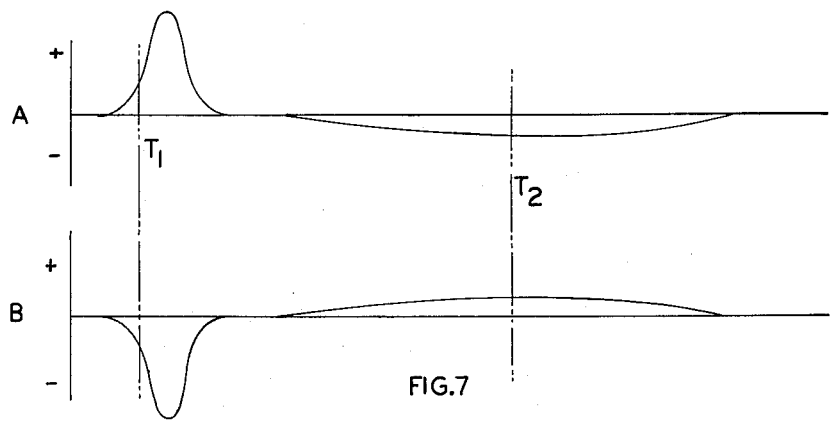
Figure 8:
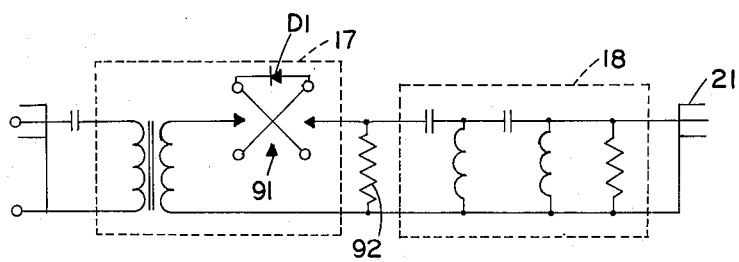
Figure 9:
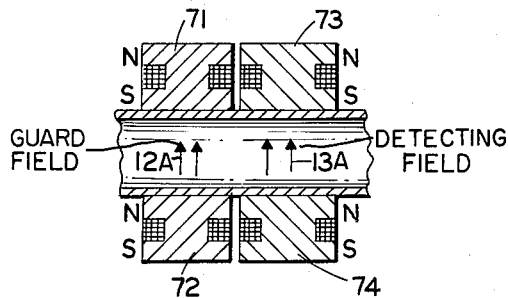
Figure 10:
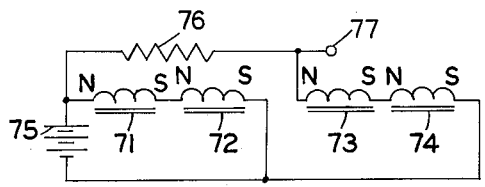

FIG. 7 graphically represents signal waveforms as a function of time and particle position in the region between opposed plates;

FIG. 8 shows a schematic circuit diagram of a suitable polarity selector and high pass filter;

FIG. 9 is a diametrical sectional view through a particle detector showing means for establishing magnetic guard and detecting fields in a conduit; and FIG. 10 is a schematic circuit diagram of the electrical elements in a magnetic field establishing system.

Figure 1:
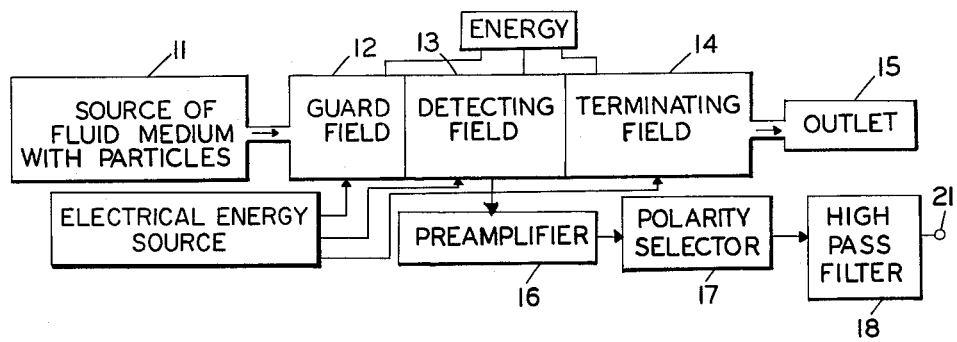
FIG. 1 is a block diagram generally illustrating the logical arrangement of a system according to the invention.

With reference now to the drawing and more particularly FIG. 1 thereof, there is illustrated a block diagram generally illustrating the logical arrangement of a system according to the invention. A source 11 of a particle bearing fluid medium directs the medium through a guard field 12, detecting field 13 and terminating field 14 to the fluid medium outlet 15. Each time a particle crosses the boundary between guard field 12 and detecting field 13, a transient signal is developed and applied to preamplifier 16. The amplified transient signals of a predetermined polarity are passed by polarity selector 17 to high pass filter 18. High pass filter 18 passes such selectively transmitted transient signals while rejecting any signals developed due to the particle leaving the terminating field 14, thereby providing an output signal on terminal 21 for each particle of a predetermined character which crosses the boundary between the guard field 12 and the detecting field 13.

It is to be understood that the particular fluid medium and particles contained therein is of little importance as long as the energy field alteration property of the medium is different from that of the particles to be detected. By energy field alteration property, it is meant the dielectric constant or magnetic permeability of the different materials. This is not a severe limitation since the instances are rare where a fluid medium and particles to be detected will have identical dielectric constants and magnetic permeability. If the dielectric constants of the fluid and the particles are the same, then the particle-bearing fluid is passed through magnetic fields. On the other hand, if the dielectric constants of the fluid and particles are different, then it is generally preferred that the particles be passed through an electric field.

By way of example, it may be desired to detect the presence of metallic particles in oil. The fields would then be established in the hydraulic system circulating oil throughout an associated mechanical system. When an excessive rate of particle flow is sensed, an alarm might be sounded indicating the possibility of a mechanical part about to fail. Such a detection system is especially advantageous in predicting mechanical failures in aircraft. Numerous other uses of the invention will be suggested to those skilled in the art.

Figure 2:
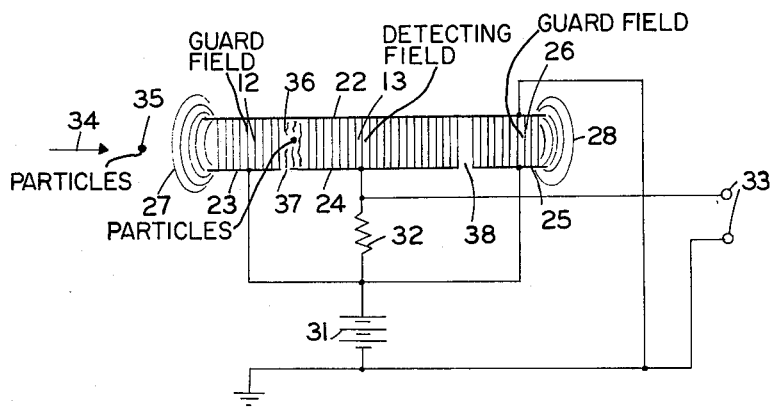
FIG. 2 illustrates one embodiment of the invention wherein guard fields are provided on both sides of the detecting field.

Referring to FIG. 2, there is shown a diagrammatic representation of an electrode configuration for establishing guard fields on either side of the detecting field. With this type of configuration, an output signal will be provided of one polarity when the particle enters the detecting field and of opposite polarity when the particle leaves the detecting field. Basically, this configuration includes a common plate 22 normally maintained at ground potential opposite three substantially coplanar plates maintained at substantially the same static potential with respect to the common plate 22. These plates are the input guard plate 23, the signal plate 24 and the output guard plate 25. The input guard field 12 is established between the common plate 22 and guard plate 23. The detecting field 13 is established between common plate 22 and signal plate 24. The output guard field 26 is established between the common plate 22 and the output guard plate 25. The fields 12, 13 and 26 are substantially constant under static conditions and are oriented normal to the plane of the plates. Fringing fields 27 and 28 are developed at the edges of the plates as shown.

The negative terminal of a battery 31 is grounded and the positive terminal connected directly to guard plates 23 and 25 and to signal plate 24 through resistor 32. As a result, the guard fields 12 and 26 remain substantially constant and equal to the static component of the field 13.

The output signal developed across resistor 32 is coupled to output terminals 33.

The direction of fluid flow is represented by the arrow 34. A particle 35 is shown to the left of the fringing field 27 and a second particle 36 is shown in the plane which includes the gap 37 between the guard plate 23 and the signal plate 24. A similar gap 38 is defined by the oppositely adjacent edges of signal plate 24 and guard plate 25.

It is well known that the capacity between opposed insulatedly separated conducting plates is proportional to the dielectric constant of the medium there between. The charge stored by a capacitor is directly proportional to its capacitance and inversely proportional to the voltage across its plates. With these fundamental properties of a capacitor in mind, the mode of operation of the structure shown in FIG. 2 may be explained.

Effectively the structure in FIG. 2 forms three capacitors, one between the common plate 22 and the input guard plate 23, a second between the common plate 22 and the signal plate 24 and the third between the common plate 22 and the output guard plate 25. Under equilibrium conditions, the plates 23, 24 and 25 are at the same potential. With no particles between the plates, the dielectric constant of the insulating material between plates is the same. As a result, the charge density on each plate is the same.

When a particle, such as particle 35, enters the region between plates, the capacity of that plate is altered due to the change in dielectric constant of the insulating medium between plates. If the dielectric constant of the particle is greater than that of the medium, the capacity increases. Since the battery 31 is directly connected between the guard plates and the common plate, the charge stored by the respective capacitors comprising these plates changes in direct proportion to the alteration in dielectric constant. Should the dielectric constant increase, the additional charge is delivered by the battery 31. After the particle leaves the region between guard plate and common plate, this additional charge is restored to the battery. Thus, average power delivered by the battery to the plates is essentially zero. If the dielectric constant is reduced upon entry of a particle, charge is first delivered to the battery and then recovered therefrom.

A similar phenomenon occurs when the particle enters the region between the common plate 22 and the signal plate 24. However, since the exchange of the charge between battery and capacitor occurs through the resistor 32, the voltage between plates 22 and 24 does not remain constant but changes in proportion to the voltage drop developed across resistor 32. However, the average power withdrawn from the battery is still essentially zero since if energy is withdrawn from the battery when the particle enters the detecting field, it is returned to the battery upon departure therefrom. The signal power developed across resistor 32 is derived from kinetic energy of the particle. Consequently, the battery functions essentially to provide a bias and may be of relatively low capacity with its operating life corresponding essentially to its shelf life.

Figure 3:
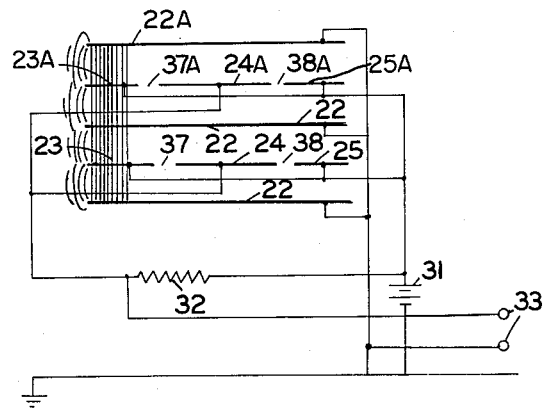
FIG. 3 illustrates another embodiment of the invention in which stacked plates are utilized.

Referring to FIG. 3, there is shown a number of electrodes like those shown in FIG. 2. In FIG. 3 the electrodes are stacked to increase the cross-section for intercepting the fluid medium without reducing the sensitivity of the device for detecting particles. Since the structure of the different plates is essentially the same as that shown in FIG. 2, the reference numerals of FIG. 2 are used to identify corresponding elements in FIG. 3 with the upper set of plates designated by the corresponding numerals with an appended A.

If the cross-section intercepting the fluid medium were increased merely by spreading apart opposed plates, sensitivity would be appreciably reduced because a particle of a given size would then effect a much smaller fractional change in the dielectric constant of the medium separating the plates. This is overcome by utilizing the stacked plates as shown in FIG. 3. While only four pairs of plates are shown, any number may be used, the selected number depending upon the cross sectional area of the fluid being examined and the desired sensitivity.

Figure 4:
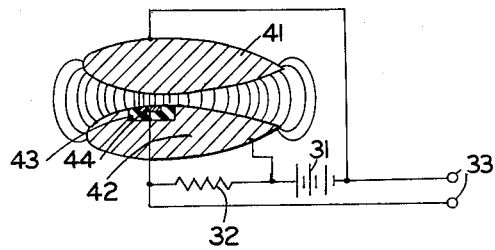
FIG. 4 shows still another embodiment of the invention in which both terminating and guard fields of controlled form are established on both sides of the detecting field.

Referring to FIG. 4, there is shown a view in section of streamlined electrodes for minimizing the development of turbulence as the fluid passes between the plates. In high velocity hydraulic systems, turbulence produced around the edges of blunt electrodes might interfere with satisfactory operation of the system. The streamlined shape of the electrodes in FIG. 4 helps to alleviate this difficulty.

The common stator plate 41 is connected to the negative terminal of battery 31. The lower electrode 42 functions as both the input and output guard plate. An insulating section 43 separates the signal plate 44 from the electrode 42. The resistor 32 is connected between signal plate 44 and a positive terminal of battery 31 by an insulated lead. The latter terminal is directly connected to the electrode 42. Operation of this system is essentially the same as that described above.

Figure 5:
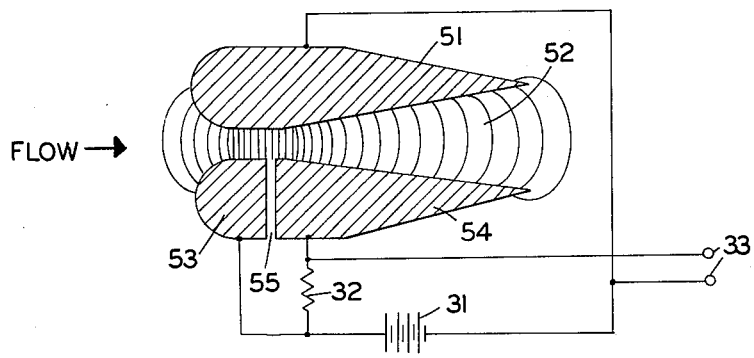
FIG. 5 shows still another electrode configuration for establishing a single guard field together with both input and output terminating fields of controlled form.

Referring to FIG. 5, there is illustrated still another configuration of the invention. In this configuration, the output guard field is replaced by a terminating field 52 which decreases in strength as the output side of the region between electrodes is reached. As a result, an abruptly changing transient signal is provided only when a particle crosses the plane including the gap between the guard and signal plate.

The common plate 51 is rounded at the input end and tapers to a point at the output end. The input guard plate 53 is also rounded at the input end and is separated from the signal plate 54 by the gap 55. The output end of signal plate 54 is also tapered to a point so that the spacing between the common plate 51 and the signal plate 54 increases as a fuction of distance from the plane including the gap 55.

In a manner similar to the previously discussed configurations, the positive terminal of battery 31 is connected to the guard plate 53 directly and to the signal plate 54 through resistor 32. Its negative terminal is connected directly to the common plate 51. The output signal is derived at terminal 33 between the signal plate 54 and the negative terminal 31.

Figure 6:
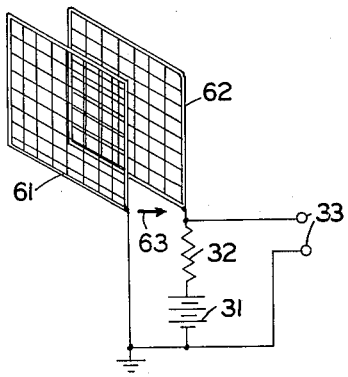
FIG. 6 shows another electrode configuration utilizing a pair of screens oriented perpendicular to the direction of fluid medium flow.

Referring to FIG. 6, there is shown still another electrode configuration in which the guard fields are substantially zero, yet the effects of fringing fields are virtually eliminated to yield a sharp indication of the instant that a particle enters or leaves the region between plates. This is accomplished by utilizing a front plate 61 and a rear plate 62, the direction of fluid flow being as indicated by the arrow 63. Both plates are screens having a mesh sufficiently large to admit the particles suspended in the incident fluid medium. The field direction is essentially normal to and combined between plates 61 and 62. The particles do not penetrate the fringing fields around the edges of the electrodes 61 and 62 if the fluid flow is primarily well within the perimeter of these electrodes. Thus, an abruptly changing transient signal is developed across resistor 32 when a particle crosses either the front electrode 61 or the back electrode 62.

Referring to FIG. 7, there is shown a graphical representation of typical signal waveforms developed across resistor 32 as a function of time and the distance of a particle from the input edge between the electrodes. FIG. 7A shows that a positive transient pulse is developed when the dielectric constant of the fluid is greater than that of the particle. FIG. 7B shows a transient pulse of negative polarity being developed when the dielectric constant of the particle is greater than that of the fluid medium. These specific waveforms will be provided in response to a particle passing through an electrode configuration generally of the type shown in FIG. 5.

Time $T_1$ corresponds to the particle entering the plane which includes the gap 55. At this time, the signal changes amplitude abruptly. After the charge has readjusted to the steady state value corresponding to a dielectric constant with the particle in the detecting field between the sensing plate and the common plate, there is no further charge flow and the signal returns to zero until the particle leaves the output edge of the region between the plates, corresponding to time $T_2$. Since the electric field intensity gradually decreases, this change is not so abrupt as the change which occurs at time $T_1$.

These signals may be selectively transmitted by a number of techniques. One technique which may be employed is polarity selection. Thus, positive pulses greater than a predetermined amplitude indicates particles having a dielectric constant less than that of the fluid medium while negative pulses having an amplitude greater than a predetermined level are indicative of particles having a dielectric constant greater than that of the medium. In addition, a high pass filter may be utilized to discriminate between the short pulses occuring around time $T_1$ and the pulses of longer duration which occur around time $T_2$.

Referring to FIG. 8, one embodiment of a suitable polarity selector 17 is shown cascaded with a high pass filter 18. The output from the preamplifier 16 is transformer-coupled through a diode $D_1$ whose polarity may be selectively oriented by the double-throw switch 91 to provide a signal of the desired polarity across resistor 92. A two-section high pass filter then couples the high frequency components of the signal across resistor 92 to the output resistor 93 which is connected to output terminal 21.

Referring to FIG. 9, there is shown a diametrical sectional view through a conduit having adjacent pairs of diametrically opposite magnets next to the outer surface of the conduit. These magnets establish adjacent guard and detecting fields 12A and 13A within the conduit as shown. The guard field 12 is established between the opposed pole faces of magnets 71 and 72. The detecting field 13 is established between the opposed pole faces of magnets 73 and 74. A third pair of magnets may be placed to the right of the latter pair if it is desired to establish a terminating field. The opposed pole faces may be shaped so as to provide a progressively attenuated field generally in the same manner as described above in connection with the establishment of electric fields.

Referring to FIG. 10, there is shown a schematic circuit diagram of a suitable interconnecting arrangement of the different coils in accordance with the principles of the invention. A battery 75 delivers current directly through the serially-connected coils of magnets 71 and 72 and through resistor 76 to the serially-connected coils of magnets 73 and 74. Signal pulses developed across the latter resistor in response to a particle crossing the boundary of the detecting field are provided on terminal 77 for processing in the manner described above.

The walls of the conduit are preferably made of material having low magnetic permeability so that a magnetic field of substantial strength is established inside the conduit. The specific means for establishing the fields may differ from that disclosed above. For example, the static components of the fields might be established by permanent magnets. Three coils could then be eliminated. Only a single coil surrounding the flux path of the detecting field would be required for detection.

There has thus been described a novel system for accurately and efficiently detecting the presence of minute particles in a fluid medium. Detection is accomplished with reliably operating circuit components requiring a minimum of power. When the fluid medium is combustible, the danger of fire and explosion is appreciably reduced since no conducting current is passed through the fluid. Different types of particles may be detected due to the inclusion of polarity and frequency selectivity.

It is apparent that those skilled in the art may now make numerous modifications of and departures from the specific embodiments described herein without departing from the inventive concepts. Consequently, the invention is to be construed as limited only by the spirit and scope of the appended claims.

What is claimed is:

1. Electrical apparatus comprising, means defining a passage for receiving a particle bearing fluid medium entering at one end of said passage and leaving at the other, said medium and particles having different energy field alteration properties, first means for establishing a substantially constant guard energy field in a first region of said passage adjacent to said one end, second means for establishing a detecting energy field in a second region in said passage adjacent to said first region, said means for establishing a detecting field having means for establishing a static component substantially equal to said guard field and means for establishing a transient component when one of said particles crosses the boundary between said first and second regions, and means responsive to the occurrence of said transient component for providing an output signal characteristic of said particles crossing said boundary, said means responsive to the occurrence of said transient component including polarity sensitive means for providing an output signal only when said transient component is of a predetermined polarity.

2. Electrical apparatus comprising, electrodes defining a passage for receiving a particle bearing fluid medium entering at one end of said passage and leaving at the other, said medium and particles having different dielectric constants, first means for establishing a substantially constant guard electric field in a first region of said passage adjacent to said one end, second means for establishing a detecting electric field in a second region in said passage adjacent to said first region, said means for establishing a detecting electric field having means for establishing a static component substantially equal to said guard electric field and means for establishing a transient component when one of said particles crosses the boundary between said first and second regions, and means responsive to the occurrence of said transient component for providing an output signal characteristic of said particles crossing said boundary, said means responsive to the occurrence of said transient component including polarity sensitive means for providing an output signal only when said transient component is of a predetermined polarity.

3. Electrical apparatus comprising means defining a passage for receiving a particle bearing fluid medium entering at one end of said passage and leaving at the other, said medium and particles having different energy field alteration properties, first means for establishing a substantially constant guard energy field in a first region of said passage adjacent to said one end, second means for establishing a detecting energy field in a second region in said passage adjacent to said first region said means for establishing a detecting energy field having means for establishing a static component substantially equal to said guard energy field and means for establishing a transient component when one of said particles crosses the boundary between said first and second regions, means responsive to the occurence of said transient component for providing an output signal characteristic of said particles crossing said boundary, and third means for establishing a terminating energy field in a third region in said passage adjacent to said second region and said other end, the strength of said terminating energy field decreasing gradually with increasing distance from said second region.

4. Electrical apparatus comprising, electrodes defining a passage for receiving a particle bearing fluid medium entering at one end of said passage and leaving at the other, said medium and particles having different dielectric constants, first means for establishing a substantially constant guard electric field in a first region of said passage adjacent to said one end, second means for establishing a detecting electric field in a second region in said passage adjacent to said first region, said means for establishing a detecting electric field having means for establishing a static component substantially equal to said guard electric field and means for establishing a transient component when one of said particles crosses the boundary between said first and second regions, means responsive to the occurrence of said transient component for providing an output signal characteristic of said particles crossing said boundary, and third means for establishing a terminating electric field in a third region in said passage adjacent to said second region and said other end, the strength of said terminating electric field decreasing gradually with increasing distance from said second region.

References Cited by the Examiner

UNITED STATES PATENTS

| | | | |
|---|---|---|---|
| 2,671,200 | 3/1954 | Lederer | 324—71 |
| 2,886,787 | 5/1960 | Broadhead et al. | 310—9.8 X |
| 2,933,924 | 4/1960 | Jenks | 324—33 X |
| 2,950,387 | 8/1960 | Brubaker. | |
| 2,950,436 | 8/1960 | Butticaz | 324—61 |
| 3,009,101 | 11/1961 | Locher | 324—61 |

WALTER L. CARLSON, *Primary Examiner.*

SAMUEL BERNSTEIN, FREDERICK M. STRADER, *Examiners.*